United States Patent [19]

Le Goff

[11] Patent Number: 4,485,629
[45] Date of Patent: Dec. 4, 1984

[54] METHOD AND DEVICE FOR STORAGE IN CHEMICAL FORM OF MECHANICAL OR THERMAL ENERGY AND FOR RECOVERY THEREOF IN MECHANICAL FORM

[75] Inventor: Pierre Y. J. Le Goff, Vandoeuvre, France

[73] Assignee: Centre National de la Recherche Scientifique-C.N.R.S., France

[21] Appl. No.: 405,306

[22] Filed: Aug. 4, 1982

[30] Foreign Application Priority Data

Aug. 6, 1981 [FR] France .................. 81 15263

[51] Int. Cl.³ .............................................. F01K 25/06
[52] U.S. Cl. ........................................ 60/659; 60/673; 165/104.12
[58] Field of Search ................... 60/659, 649, 673; 165/104.12

[56] References Cited

U.S. PATENT DOCUMENTS 4,183,218  1/1980  Eberly, Jr. ........................ 60/673
4,292,808 10/1981  Lohmiller ......................... 60/673

Primary Examiner—Allen M. Ostrager
Attorney, Agent, or Firm—Steinberg & Raskin

[57] ABSTRACT

The invention relates to a method for storage, in chemical form, of a quantity of mechanical or thermal energy, and for recovery, in mechanical form, of the energy stored; the invention also relates to devices for implementation of this method. The device comprises chambers for containing a non-ideal solution of a vapor and a liquid and chambers for containing liquified vapors separated from the non-ideal solution, these chambers being in close thermal contact, and whose volumes are connected by ducts to a motor for recovery of the stored energy during the recovery phase. Said motor can operate as a compressor for imparting the energy to be stored during the storage phase. The invention applies to the storage of any mechanical, electrical or thermal energy, and its recovery at the time of need.

14 Claims, 5 Drawing Figures

METHOD AND DEVICE FOR STORAGE IN CHEMICAL FORM OF MECHANICAL OR THERMAL ENERGY AND FOR RECOVERY THEREOF IN MECHANICAL FORM

BACKGROUND OF THE INVENTION

The present invention relates to a method of storage, in chemical form, of a quantity of mechanical or thermal energy, and of the recovery, in mechanical form, of at least a part of the said stored energy. The invention also relates to devices for the implementation of such a method.

At present, there is no practical machine for effecting the storage, in chemical form, of mechanical or thermal energy, and the recovery thereof, when desired, in mechanical form.

Electric storage batteries do, of course, constitute a means of chemical storage of energy which is usually converted from electrical form and then likewise recovered in electrical form. The drawbacks of such electric accumulators are essentially their high price and heavy weight. These devices are thus prohibitive for high power storage. In addition, the percentage of recovery of the stored electrical energy is relatively low, in practice, less than 50%.

The method of this invention makes it possible, by the use of simple devices, to store mechanical or thermal energy in chemical form, and to recover it at the desired time, with efficiencies that can reach and perhaps exceed 80%, based upon the behavior of non-ideal solutions and the vapors of their constituents.

DEFINITIONS

For purposes of this invention the term "solution" is a homogenous molecular mixture of two or more substances. The mixture of solute and solvent, which may include products of association of the two, is called the solution. It should be noted that in "ideal" solutions there is no fundamental difference in roles between the solute and solvent.

An "ideal solution" is defined as one which obeys Raoults' law over the whole range of composition and at all temperatures. To generalize, in an ideal solution the constituents, solutes and solvents shall have similar intermolecular forces. They shall be miscible in all proportions and on mixing the constituents there shall be no change in their partial volumes and the total energy of solution will be the sum of its constituents. Thus, there will be no heat of mixing of the substances in the liquid state.

"Non-ideal" solutions, in contrast to "ideal solutions", refers to solutions wherein the intermolecular forces between the constituents are not the same and thus deviations from the "ideal" for all the colligative properties are to be expected. In some non-ideal solutions, compounds are formed between the solutes and solvents leading to deviations from Raoults' law. Other factors leading to the non-ideal state in solution include ionization of the solutes, extreme concentration, solvents comprising dissolved salts and differing vapor pressures between the solute, solvent and solution.

SUMMARY OF THE INVENTION

The method according to the invention is characterized by the use of the mechanical or thermal energy to be stored, to separate by compression, partially, the constituents of a concentrated solution with a high percentage of solvent, to form, on the one hand, substantially pure, liquid solvent, and on the other hand, a solution with a lower percentage of solvent in solution. Then, when the said energy is to be recovered, the vapor of the solvent is caused to expand and work in a vapor motor, such as a piston, screw, or gear engine, or a turbine, in which said solvent vapor mixes with the lowered percentage solution to re-form the original solution. The flow of solvent which vaporizes at a given pressure is brought into thermal contact, with the solution having the lower content of solute at a pressure below the initial pressure of the solvent.

Advantageously, these operations are conducted in a substantially isothermal manner, for example at ambient temperature, which takes care of any problems of heat loss.

Again, advantageously, the working is carried out substantially adiabatically, meaning that the implementation of the method of the invention can be independent of any troublesome addition of external heat.

Basically in its procedural aspects, this invention is a method of storing and regenerating energy which comprises, in the storage phase the steps of supplying a non-ideal solution consisting of a solute and solvent in certain proportions; separating the vapors of solvent from said solution; compressing the separated vapor by pump means, driven by stored energy, to liquify solvent vapors, thus leaving said separated solution with a greater concentration of solute and depleted in solvent; separately storing said liquified solute from said solute-depleted, solvent-concentrated solution as potential energy in chemical form. Then in its regeneration phase, the invention involves the steps of regenerating the energy from its chemical form by the steps of vaporizing said liquified solvent through a vapor expansion motor to expand said solvent and to generate mechanical energy, and contacting said solvent vapors with said solvent-depleted, solute concentrated solution to re-form the non-ideal solution in its original proportions.

The constituents of the solution, solute and solvent are selected so as to form a reactive, highly non-ideal solution, having the following properties;

the volatility of the solute is negligible in comparison with that of the solvent, the presence of the dissolved solute in the solution lowers the vapor pressure of the solvent to a greater degree than would follow from the classic law of ideal solutions.

As an example of such highly non-ideal reactive solutions, it is possible to cite, in particular, the mixture of ammonia ($NH_3$) which constitutes the "solvent" and water ($H_2O$) which constitutes the solute constituent of the solution. Other mixtures can be cited, such as, for example, the mixture of ammonia ($NH_3$) and aqueous sodium thiocyanate (NaSCNO); the mixture of ammonia ($NH_3$) and aqueous lithium bromide solutions. Although water is generally considered to be the solvent in a solution of ammonia and water, ammonia is to be considered the solvent for the purposes of this discussion.

Other solvents than ammonia can also be suitable, in particular, methylamine ($CH_3NH_2$), methanol ($CH_3OH$), ethanol ($C_2H_5OH$), and water ($H_2O$).

For each solvent, a variety of appropriate solutes can be used. The most effective are, in general, lithium salts (bromide, chloride and chlorate).

For the practical implementation of the method of the invention it is advantageous to use an apparatus or a device which has at least one feed of solvent, at least one feed of concentrate, at least one discharge of diluate and at least one vapor motor connected by its intake to the solvent feed, and by its exhaust to the concentrate feed, this device being characterized in that it comprises at least one chamber in which the flow of solvent to be vaporated is admitted, and at least one chamber in which the flow of concentrate to be diluted is admitted, the said chambers being disposed in close thermal contact with one another. It is found, as a matter of fact that, when operating in such a device, the latter will function under close to ideal thermodynamic conditions, making it possible to achieve recovery level of the stored energy exceeding 80%. It should be noted that this is a case of direct conversion of mechanical energy into chemical energy without passing through a thermal energy stage. The concept of "Carnot's limiting efficiency" therefore does not apply to these machines.

In its equipment aspects this invention is based on an apparatus for effecting the storage and regeneration of energy via storage of said energy in chemical form which apparatus comprises at least one first chamber for said solution and at least one second chamber for said liquified solvent, said first and second chamber being connected via at least one vapor motor capable of using energy in the compression mode and dispensing energy in the expansion mode. When said vapor motor is in the compression mode it utilizes the energy to be stored to remove the solvent vapor over the solution in said first chamber compresses by said energy the solvent vapor. It then discharges the compressed solvent into said second chamber in liquified form, leaving in said first chamber a solution depleted in solvent and enriched in solute. When said motor is in the expansion mode, the liquified solvent is fed and vaporized through said vapor motor to regenerate, as mechanical energy, the energy stored in chemical form in said liquified solvent feed, discharging the vaporized and expanded solvent into contact with the depeleted solution to reconstitute the solution into the proportions thereof befoe said compression. The apparatus also includes storage means for the contents and feeds of said first and second chambers.

The apparatus of the invention also provides for each of said first and second chambers to be separated by a mutual thermoconductive wall thus permitting heat exchange between the contents of said first and second chambers.

In the practical sense, the solvent evaporation chamber comprises a wall along which the solvent is fed and flows, the concentrate dilution chamber comprises a wall along which the concentrate is fed and flows, and the said two walls are in close thermal contact with one another, which can be obtained most simply and most effectively by arranging it so that the two walls comprise the opposed faces of the same physical wall, which faces the solvent and the concentrate flow respectively.

When it is desired to increase the power of the installation, while maintaining its compactness, it is advantageous to dispose several chambers, stacked one against the other, forming alternate chambers for solute evaporation and chambers for dilution of the solvent concentrate.

BRIEF DESCRIPTION OF THE DRAWINGS

The invention, and its implementation, will appear more clearly with the aid of the following description, given in reference to the attached drawings in which.

DESCRIPTION OF PREFERRED EMBODIMENTS

The invention will be described by reference to the system where ammonia ($NH_3$) is the solvent and water ($H_2O$) is the solute. The non-ideal solutions from this system include ranges where said solvent and solute range over various concentrations as the ammonia is vaporized from its solution with water. This is the presently preferred mode for practice of the invention. However this mode and its description are merely exemplary.

Figure 1:
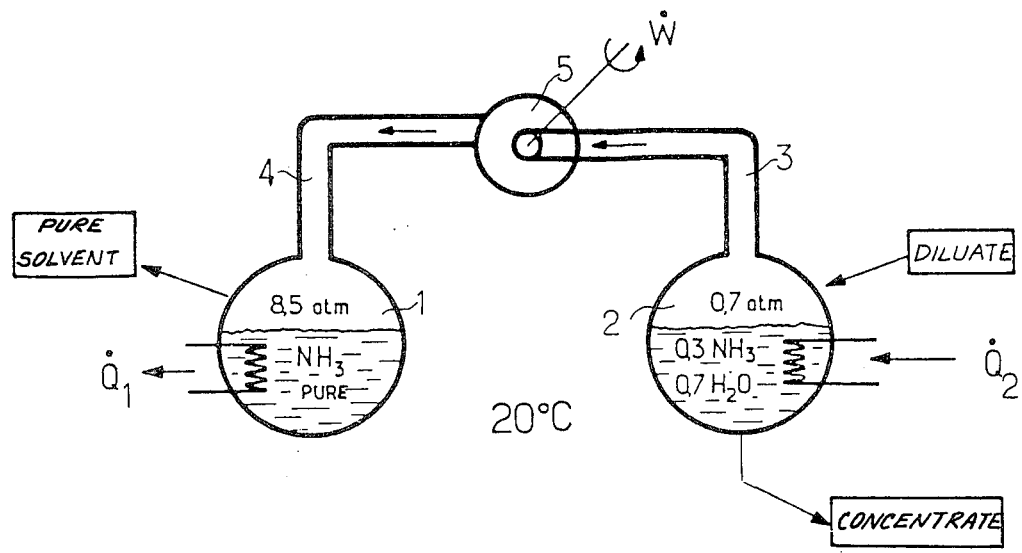
FIGS. 1 and 2 illustrate the known principle of balancing a volatile solvent concentrate solution of a non-ideal solution binary mixture, the components of which exchange their vapor at different pressures.
Figure 2:
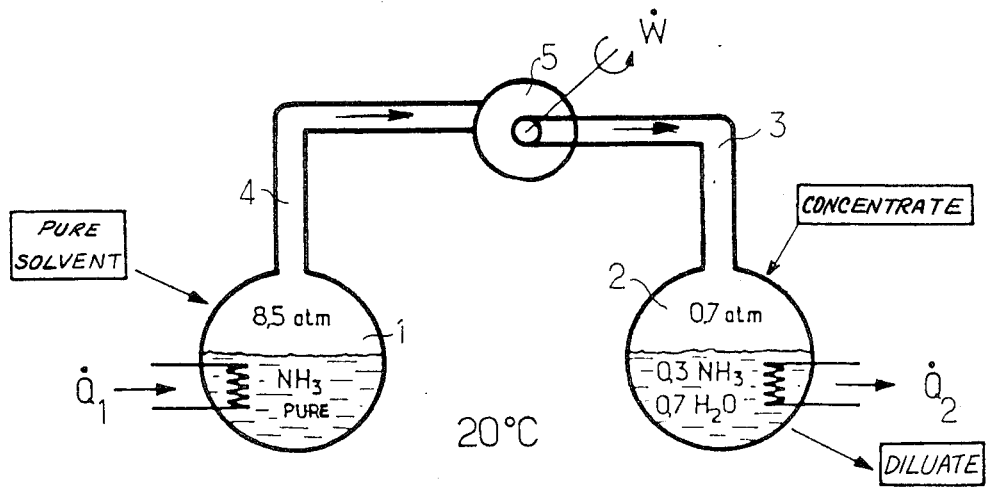

Reference is made first of all to FIGS. 1 and 2 which illustrate a physical principle that is known but has never before been practically applied in practice.

A sealed flask 1, contains pure ammonia ($NH_3$), the solvent, at a pressure of 8.5 atmosphere, (1 atmosphere = 1.0133 bars).

In a second flask 2, kept at a pressure of 0.7 atmosphere, the solution is a mixture of 30% ammonia ($NH_3$) and 70% water ($H_2O$). Under these conditions, the vapor pressure curves show that these compounds are stable at the temperature of 20° C. Moreover, under such conditions, the composition of the vapor present in flask no. 2 above the solution, initially 60% water and 40% ammonia, is substantially pure ammonia (98.6% ammonia).

If the two flasks are connected by ducts 3,4 and a compressor 5, it is possible to cause the practically pure ammonia to pass from flask 2 into flask 1. In other words, from a feed solution with 60% $H_2O$ content, a diluted $NH_3$ solution with higher water content (70%), will be prepared. The mechanical energy provided by compressor 5 will be stored in chemical form, that is to say in the form of pure ammonia, in flask 1. The separation of the ammonia vapor also requires an addition of heat $Q_2$ to flask 2, and the removal of a substantially smaller quantity of heat $Q_1$ from flask 1. For example, at 20° C.:

$$Q_1 = 1200 \text{ kJ/kg of } NH_3 \text{ and } Q_2 = 1660 \text{ kJ/kg.}$$

Inversely, as illustrated in FIG. 2, and assuming, for example, that compressor 5 can work reversibly as a motor, pure ammonia can be allowed to evaporate from flask 1 toward the concentrated water solution (more than 60% $H_2O$) contained in flask 2. The concentrate will then become enriched in ammonia, that is to say in solvent, meaning that it will become enriched to form the 30% $NH_3 + 70\%$ $H_2O$ solution.

There again, the reaction will remain in equilibrium only if flask 1 is supplied with the heat $Q_1$ necessary to maintain the temperature at 20° C. and if flask 2 likewise, is cooled so as to maintain its temperature likewise at the assumed temperature of 20° C. by extracting the heat $Q_2$.

Since all reactions described above are perfectly reversible, the theoretical efficiency of the operation should be 100% in both cases.

In practice, the efficiency of the process would be limited by that of compressor motor 5. Assuming this to be equal to about 90%, the efficiency of the conversion would then come to about 81% for a complete storage and recovery cycle.

In practice, such an installation would encounter serious difficulties of implementation in view of the additions and withdrawals of heat that have to be made in each flask, and in view of the variations in the composition of the diluted and concentrated solutions of solute in solvent in flask 2.

Figure 3:
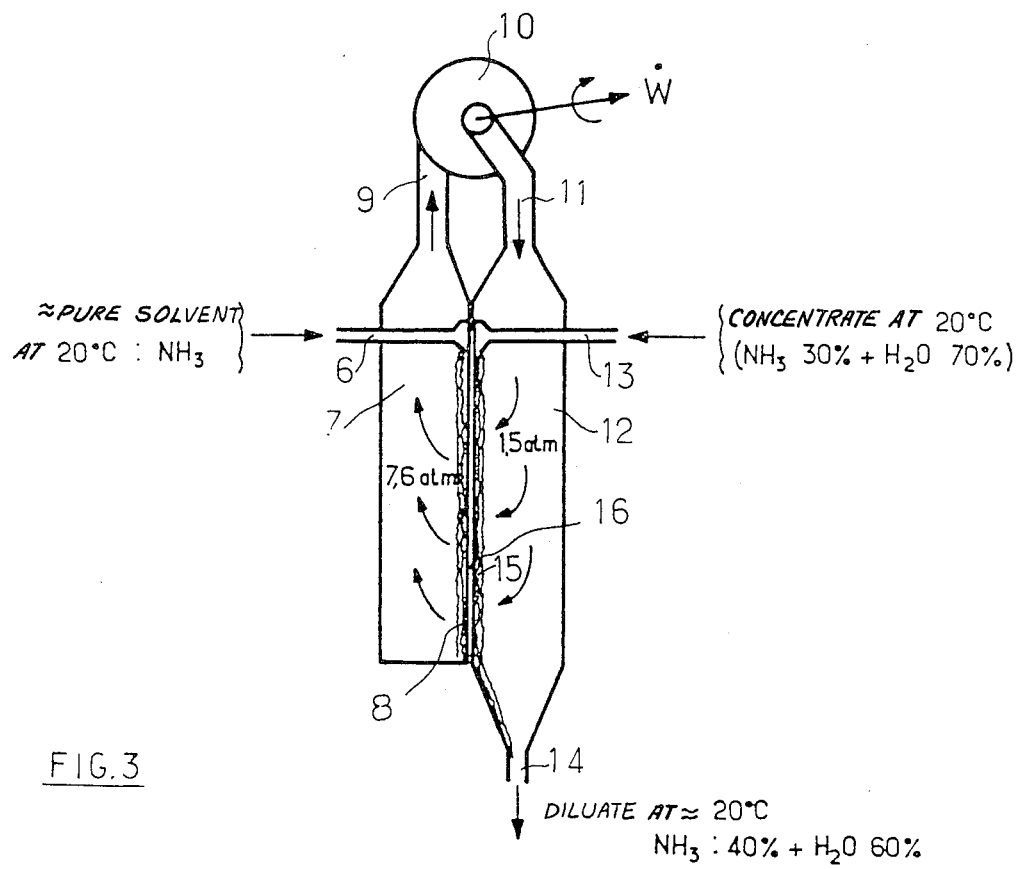
FIG. 3 illustrates, schematically, an embodiment of a basic device that permits the implementation of the present invention including conversion to chemical energy storage and the recovery in mechanical form of the stored chemical energy.

However, FIG. 3 shows an apparatus and installation designed according to the present invention, for solving these problems.

According to the present invention, the pure solvent of the solution, for example liquid ammonia at 20° C., at the pressure equilibrium of 8.5 atmospheres introduced by duct 6 to the top of chamber 7 flows by gravity along wall 8 in the chamber. Chamber 7 can be classic structure of a plane exchanger, used industrially as a concentrator of solutions, for example, saline brines or sugars. Chamber 7 can preferably be equivalent to the chambers of stills, for example for seawater as described, for example, in French Pat. No. 80,17676 filed Aug. 11, 1980, with a view to the constitution of evaporator-separators or evaporator-mixers for the recovery of low-level thermal energy.

The ammonia vaporizing in chamber 7 is then led through a duct 9 to the intake of motor 10 such as a piston engine, a screw engine, a gear engine or, a turbine. The ammonia vapor in the expanded state issues from exhaust 11 of motor 10 and condenses in a chamber 12, structurally similar to chamber 7, and into which there is brought, at the top, through a duct 13, the solution of 30% $NH_3 + 70\%$ $H_2O$ which, at the bottom of the chamber, after absorbing the ammonia vapor, will form the 40% $NH_3 + 60\%$ $H_2O$ solution evacuated via duct 14 to a storage chamber (not shown).

As a matter of fact, if the expansion is adiabatic, the fluid cools, and issues from the motor at −37° C. and in partially condensed form, i.e. 85% as vapor and 15% as a liquid mist.

To avoid the formation of this mist, and to keep the fluid at 20° C. requires an input of heat of 390 kJ/kg.

Two variations can be utilized to add this heat:

(a) Equip the motor and its exhaust pipe 11 with vanes in order to add this heat "gratis" from the ambient medium, and hence keep the device isothermic overall, as assumed above; or (b) Let the motor work adiabatically and place, on duct 11, at the outlet from the motor, a heat exchanger to reheat the exit fluid from −37° C. to +20° C. The choice of the motor should be confined to types which are able to work with the medium containing a level of about 15% droplets of liquid ammonia.

It will be found that the latter solution is particularly advantageous in the sense that it constitutes a usable "source of cold." For example, with a reflux exchanger, an auxiliary cold-carrying fluid would thus be cooled from +20° C. to about −30° C.

Thus, in reversible working, such a system would produce, simultaneously, for each kg of vaporized ammonia, 330 kilojoules of mechanical energy at the motor shaft, and 390 kilojoules of cooling energy, in the form of a cold-carrying fluid at −30° C.

In the example of the preferred mode being illustrated, the vaporization of ammonia in chamber 7 requires an addition of heat, while the condensation leading to the mixture in chamber 12 of the 30% $NH_3 + 70\%$ $H_2O$ solution and the solvent ($NH_3$), requires the withdrawal of heat.

This can be achieved in the described apparatus by the fact that the wall 15, on which the 30% $NH_3 + 70\%$ $H_2O$ solution flows, constitute one face of plate 16, whose other face constitutes the wall 8 over which the solvent ($NH_3$) flows. In order that the heat may pass from one chamber to the other, a thermal gradient is necessary. In the illustrated example, this gradient was about 6° C., the average temperature of the ammonia flowing over wall 8 then being 17° C., and the average temperature of the concentrate flowing over wall 15 being 23° C. Under these conditions, the pressures of equilibrium in chambers 7 and 12 are established at 7.6 atmospheres and 1.5 atmospheres respectively. The pressure difference is utilized to drive the motor 10 which therefore recovers, in mechanical form, the chemical energy stored in the form of liquid ammonia and the 30% $NH_3 + 70\%$ $H_2O$ solution.

The power is a function of the flow. The maximum possible flow is a function of the heat exchange and evaporation capacity of the plates, that is to say of their surface, and the thermal gradient available. The system works in a substantially isothermic and adiabatic manner.

It will be noted, as a matter of fact, that the heat of condensation-mixing of a given quantity of ammonia in the solution, $Q_2$ is higher than the heat of vaporization of the same quantity of ammonia, $Q_1$.

It follows that the temperatures in the apparatus, will have a tendency to rise, resulting in a rise in pressures, and hence a gain in power.

Calculations show that with a thermal gradient of 6° C. between faces 15 and 8, and under the operating conditions indicated, it is reasonable to obtain a power level of 24 to 36 KW/m² of surfaces of exchange plate 16.

Figure 4:
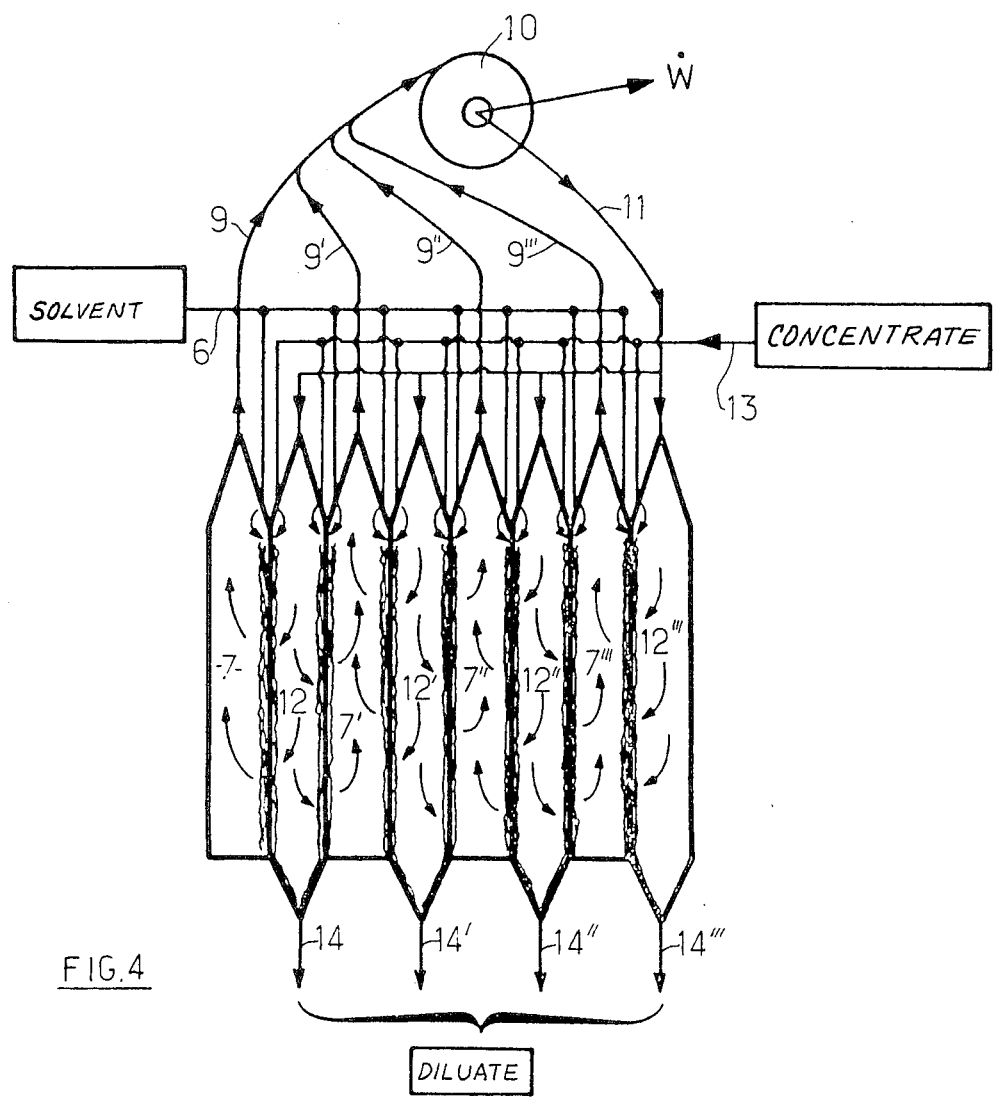
FIG. 4 shows a variation of embodiment of FIG. 3, with several adjoining devices working in parallel for conversion of stored chemical energy to mechanical energy.

Advantageously, as illustrated in FIG. 4 a plurality of adjoining chambers such as 7, 12, stacked in series, are used to constitute a plurality of stages in parallel, which can feed a motor 10. This may be a single motor unit or several units in parallel.

Figure 5:
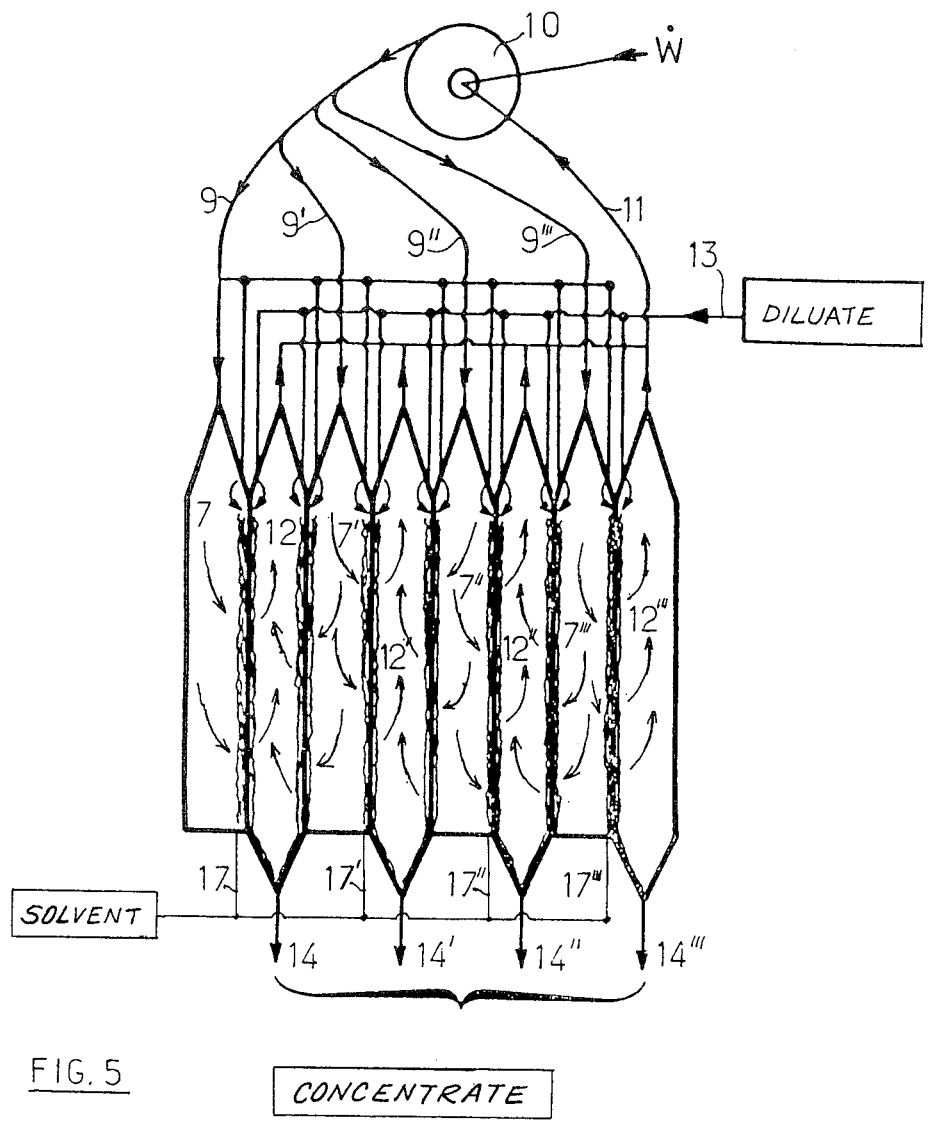
FIG. 5 shows the same device as FIG. 4, but in which the circulation has been reversed, for the storage in chemical form of mechanical energy.

To avoid repetition, the same numbers used in FIG. 3 are used in FIGS. 4 and 5 to represent similar elements, the four successive stages of similar chambers of FIGS. 4 and 5 have been marked, respectively, 7, 12, 7', 12', 7", 12", 7''', 12'''.

It will be noted that each intermediate chamber, to the exclusion of the end chambers 7 and 12''', works with its two faces to evaporate the solute and form the 30% $NH_3 + 70\%$ $H_2O$ solution from the 40% $NH_3 + 60\%$ $H_2O$ solution.

Such stacking occupying a total volume of 1 m³ formed by the assembly of twenty compartments, each one 5 cm thick with 1 m² of surface, will make it possible without difficulty, under the operating conditions specified in FIG. 3, to supply a motor with a power of 160 kw.

Referring now to FIG. 5, it can be seen that the same installation as in FIG. 4 makes it possible, by simply reversing the operation of the motor into a compressor, and reversing the feed circuits, to reconstitute the solvent ammonia and the 40% ammonia aqueous solution from the 30% ammonia aqueous solution and thus to store, in chemical form, the mechanical energy transferred to compressor 10. The only difference is the feeding at ducts 13 of the 40% $NH_3$ aqueous solution vaporizing same in part in chambers 12, 12', 12" and 12''' to form a solvent vapor (ammonia) aspirated at 11 and compressed in compressor 10, and at the base of chambers 12, 12', 12''', and the 30% $NH_3$ solution (impoverished in ammonia solvent), which is collected at 14, 14', 14'', 14'''. The ammonia solvent compressed in compressor 10 is introduced by ducts 9, 9', 9'', 9''' to chambers 7, 7', 7'', 7''', in which the vapor condenses and is collected at the base of these chambers by ducts 17, 17', 17'', 17'''.

The installation, of course, is advantageously supplemented by the storage reservoirs not shown for the respective liquids i.e., solute ($NH_3$), the 30% $NH_3$+70% solution and the 40% $NH_3$+60% $H_2O$ solution. These reservoirs have not been shown in order not to encumber the drawings.

The great flexibility of operation of the apparatus comprising this installation is worthy of note. Thus, for example, the reconstitution of the solvent and the 40% $NH_3$ aqueous solution from the 30% $NH_3$ aqueous solution can be achieved by the use of any known, classic evaporator-separator device or still. These evaporator-separators or stills can be fed by residual thermal energy of very low economic value. Solar collectors can be used to reconstitute solutions.

In every case, sufficient storage facilities for the solvent and the aqueous solutions are provided to insure autonomy during the desired working time of the installation with amounts and concentrations corresponding to optimized conditions of working, particularly of motors 10 of (FIGS. 4 or 5).

What is claimed is:

1. A method of storing and regenerating energy which comprises the steps of
   (a) supplying a non-ideal solution of a vapor and a liquid in pedetermined proportions;
   (b) separating vapors from the solution;
   (c) compressing the separated vapors by pump means, to liquify the separated vapors, thus leaving the separated solution with a greater concentration of the original liquid and depleted in the original vapors;
   (d) separately storing the liquified vapors and said vapor-depleted solution;
   (e) vaporizing liquified vapors, thus expanding the same and generating mechanical energy, through a recovery motor; and
   (f) contacting the thus-obtained vapors with the remaining vapor-depleted solution to reform the non-ideal solution in its substantially original proportions.

2. The method according to claim 1 wherein steps (d) and (e) are performed under substantially isothermal conditions.

3. The method according to claim 1 steps (d) and (e) are performed under substantially adiabatic conditions.

4. The method according to claim 1 wherein, in the non-ideal solution, the vapor is ammonia.

5. The method according to claim 1 wherein the non-ideal solution is formed of ammonia and water.

6. The method according to claim 5 wherein the vapor-depleted solution is formed of about 30% ammonia and about 70% water and the vapor-rich solution contains about 40% ammonia and about 60% water.

7. The method according to claim 1 wherein the non-ideal solution is formed of ammonia and a liquid solution of a lithium salt in water.

8. The method according to claim 1 wherein the non-ideal solution is formed of ammonia and a liquid solution of sodium thiocyanate in water.

9. An apparatus for storing and regenerating energy, comprising
   a first chamber for containing a non-ideal solution of a vapor and a liquid,
   a second chamber for containing liquified vapor separated from the non-ideal solution,
   a conduit iterconnecting said first and second chambers,
   pump means disposed along said conduit, said pump means adapted to compress the vapor separated from the solution,
   means for vaporizing the liquified vapors to expand the same and generate mechanical energy, and
   means for recovering the thus-generated mechanical energy.

10. The apparatus according to claim 9 wherein said first and second chambers are separated by a mutual thermo-conductive wall, permitting heat exchange between the contents of said first and second chambers.

11. The apparatus according to claim 10 additionally comprising a heat exchanger interposed in said conduit between said pump means and said first chamber to reheat the expanded vapors passing from said second chamber to said first chamber.

12. The apparatus of claim 10 wherein said pump means is adapted to be reversed to constitute said means for vaporizing the liquified vapors.

13. The apparatus of claim 9 additionally comprising
   means for introducing liquified vapor into said second chamber, and
   means for introducing the non-ideal solution into said first chamber.

14. The apparatus according to claim 13 comprising a plurality of first and second chambers, alternately disposed to form an array of two exterior chambers and a plurality of interior chambers with said interior chambers each sharing at least two walls with adjacent chambers, all of said chambers being connected to said conduit and to said respective means for introducing the liquified vapor or the non-ideal solution.

* * * * *